United States Patent
Lahiri et al.

(10) Patent No.: US 8,429,133 B2
(45) Date of Patent: Apr. 23, 2013

(54) PARTIAL KEY INDEXES

(75) Inventors: Tirthankar Lahiri, Palo Alto, CA (US);
Dheeraj Pandey, San Ramon, CA (US);
Juan R. Loaiza, Woodside, CA (US);
Michael Zoll, Foster City, CA (US);
Kiran B. Goyal, Foster City, CA (US);
Neil J. S. Macnaughton, Los Gatos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1299 days.

(21) Appl. No.: 11/956,287

(22) Filed: Dec. 13, 2007

(65) Prior Publication Data

US 2009/0157701 A1  Jun. 18, 2009

(51) Int. Cl.
*G06F 7/00* (2006.01)
*G06F 17/00* (2006.01)
*G06F 17/30* (2006.01)

(52) U.S. Cl.
USPC .......................... 707/673; 707/665; 707/778

(58) Field of Classification Search .................. 707/2, 3, 707/10, 100, 104.1; 712/4, 3; 710/53; 341/67
See application file for complete search history.

(56) References Cited

U.S. PATENT DOCUMENTS

| | | | |
|---|---|---|---|
| 5,467,471 A | 11/1995 | Bader | |
| 5,490,258 A | 2/1996 | Fenner | |
| 5,629,695 A | 5/1997 | Watts et al. | |
| 5,956,705 A | 9/1999 | Stevens et al. | |
| 5,963,956 A * | 10/1999 | Smartt | 707/104.1 |
| 6,292,795 B1 * | 9/2001 | Peters et al. | 707/3 |
| 2002/0099691 A1 * | 7/2002 | Lore et al. | 707/2 |

\* cited by examiner

*Primary Examiner* — Susan Chen
(74) *Attorney, Agent, or Firm* — Hickman Palermo Truong Becker Bingham Wong LLP

(57) ABSTRACT

A partial reverse key index is described, which allows distributed contention as resources vie to insert data into an index as well as allows range scans to be performed on the index. To do so, before an index entry for a key value is inserted into an index, the key value is transformed using a transformation operation that affects a subset of the order of the key value. The index entry is then inserted based on the transformed key value. Because the transformation operation affects the order of the key value, the transformed values associated with two consecutive key values will not necessarily be consecutive. Therefore, the index entries associated with the consecutive key values may be inserted into unrelated portions of the index.

18 Claims, 4 Drawing Sheets

PARTIAL KEY INDEXES

FIELD OF THE INVENTION

The present invention relates to indexes and, more particularly, to partial key indexes.

BACKGROUND

Databases use a variety of indexes to speed up user access to underlying data. One common technique is to use B-trees for indexes. Generally, a B-tree is a tree data structure that keeps data sorted and allows searches, insertions, and deletions in logarithmic time. In B-trees, internal nodes can have a variable number of child nodes within some pre-defined range. B-trees have advantages over alternative implementations. For example, the number of accesses required to find data in a B-tree can be significantly fewer than when the data is stored in other ways. The fact that fewer accesses are required, in turn, increases overall index performance when stored as a B-tree.

A well-known concurrency limitation issue for B-trees has been termed as "right-growing" indexes. Right-growing an index occurs when monotonically increasing values are inserted concurrently into the index. Such values occur commonly in many applications, e.g., when inserting an ordered list of timestamps or sequence numbers. What happens when monotonically increasing values are inserted in a column that is indexed with a B-tree is that the database server attempts to insert the updated values in the index the order that the database server receives the values. As a result, the insertions always occur at the rightmost leaf block. This produces contention for the leaf block and leads to frequent reorganizations when the right most leaf fills up and must be split.

To illustrate, consider FIG. 1. FIG. 1 illustrates an exemplary table 100 with a corresponding B-Tree index 102. The table 100 has a name column 104 and a gender column 106. The value in the name column 104 is used as the key of the B-Tree index 102. The B-Tree index 102 includes branch nodes and leaf nodes.

Branch nodes contain pointers to other nodes and data that indicate the range of values associated with the nodes to which they point. For example, node 108 contains pointers 110 and 112. Node 108 also stores the letter "M" to indicate that names that begin with the letters "A" through "L" are stored in the nodes attached to pointer 110 while the names that begin with the letters "M" through "Z" are stored in the nodes attached to pointer 112.

The leaf nodes of B-Tree 102 store key values and pointers to the rows of table 100 that correspond to the key values. For example, leaf node 114 contains three entries. The first entry stores the key value "KARL" and a pointer to the row in table 100 that contains the value "KARL" in the name column. The second entry of leaf node 114 stores the key value "KRIS" and a pointer to the row in table 100 that has the key value "KRIS". The third entry of leaf node 114 stores the key value "LANE" and a pointer to the row in table 100 that contains the key value "LANE".

As new data items are inserted into the base data, new entries that correspond to the new data items are added to the index. For example, if a record where the data for column 1 is "ANGIE" and the data for column 2 is "F" was added to table 100, a corresponding index entry would be added to leaf node 116 of B-Tree 102. The new index entry would include the key value "ANGIE" and a pointer to the new row added to table 100.

FIG. 2 illustrates a system that includes two nodes 204 and 214 and a disk 200. Nodes 204 and 214 generally represent processing units that have access to the one or more disks that contain the database in which table 100 is stored. Nodes 204 and 214 may be, for example, networked workstations or clusters of processors and memory components within a multi-processing machine.

Before an entry may be added to an index, the portion of the index into which the entry is to be added must be loaded into the dynamic memory of the node that is inserting the entry. For example, assume that a transaction 210 executing in node 204 specifies the insertion of a row containing the data "ANGIE, F" into table 100. Assume also that disk block 202 stores leaf node 116 of a B-Tree index 102. To insert the appropriate index entry into index 102, disk block 202 is loaded into buffer cache 206 of node 204. In illustration, the loaded copy of the block is shown as 202'. The copy 202' of disk block 202 that is stored in buffer cache 206 is updated with the appropriate index entry for "ANGIE". At a later time, the updated copy 202' of disk block 202 is stored back to disk 200.

Typically, the closer key values are to each other in the order used by the index, the more likely the index entries for the key values will be stored in the same portion of the index. For example, index entries for "KEN", "KENT" and "KENNETH" would all be stored in leaf node 114. Consequently, there is a high likelihood that index entries for data items with consecutive key values will be stored in the same portion of an index structure.

Under many conditions, data is entered into a database in such a way that consecutive entries have consecutive key values. For example, records may be keyed into a database system in alphabetic or numeric order. Even records that do not initially have an order with respect to each other may be assigned key values based on the order in which they arrive. For example, one way to assign a unique identifier to each piece of e-mail in an e-mail system is to assign each e-mail a strictly increasing number based on the order in which the e-mail is received.

When consecutively inserted data items have consecutive key values, the new index entries for the new data items are inserted into the same portion of the associated index. For the purposes of explanation, the portion of an index into which new entries will be inserted is referred to as the "target portion" of the index. For example, while rows that contain names that begin with the letters "A" through "C" are being added to table 100, leaf node 116 will be the target portion of index 102. During the insertion process, the rate at which the target portion is accessed will be relatively high, while the rate at which other portions of the index are accessed will be relatively low.

When only one node (e.g. node 204) is being used to insert data into table 100, the fact that one portion of index 102 is heavily accessed may not have adverse effects on the efficiency of the insertion process. For example, while rows with names beginning with the letters "A" through "C" are being added to table 100, block 202 will remain loaded in buffer cache 206. However, when two or more nodes are used to insert data into table 100, the fact that one portion of index 102 is heavily accessed by both nodes may lead to significant problems.

Specifically, each node must update the most recent version of block 202 to insert an index entry into leaf node 116. Therefore, if the version 202' of block 202 in that is located in buffer cache 206 has been updated by node 204, the updated version 202' of block 202 must be written to disk 200 and loaded into buffer cache 216 before node 214 may insert an entry into leaf node 116.

The updated version 202' of block 202 that resides in buffer cache 216 would then have to be written to disk and loaded into buffer cache 206 before node 204 could insert a subsequent entry into leaf node 116. The transfer of data from the buffer cache of one node to the buffer cache of another node involves a significant amount of overhead, including multiple I/O operations and lock-related communications.

Based on the foregoing, it is clear B-trees suffer from bottleneck problems. This problem is particularly acute on multi-node clustered databases (RAC) where the successively ordered inserts could originate from different nodes, requiring a large amount of inter-node communication for the contended leaf blocks.

As a partial cure to this problem, some databases have begun to use reverse key indexes. A reverse key index does not index a column on the key value itself. Instead it reverses the bits of the key value and stores the data based on the reverse of the key value. Thus, a database converts sequences of values that may be vying for the same block into a set of values that look like random data. That data is then dispersed across multiple blocks. A technique for implementing a reverse key index is described in U.S. Pat. No. 5,956,705, issued Sep. 21, 1999.

Using a reverse key index, index entries associated with the consecutive key values can be inserted into unrelated portions of the index. For example, in reverse key indexing the transformation operation involves reversing the key value. For example, characters in a text string might be reversed. Thus, the key words KEN, KENT and KENNETH would be converted to NEK, TNEK and HTENNEK, respectively. Because the transformed key values begin with the letters "N", "T" and "H", index entries for the key values would be inserted into different portions of an index.

Then, when the index is used to process a query, the key values in the query are reversed as well. For example, if a query requires the retrieval of all rows containing the name "KEN", the word "KEN" in the query is transformed into "NEK" and the index 102 is traversed to find the leaf node that would contain the key word "NEK". The database server then follow the pointers associated with any index entries for the key work "NEK" to determine the location of the rows that contain the name "KEN".

Although reverse key indexes solve some of the problems associated with right-growing indexes, they also introduce their own set of problems.

For example, one of the main problems with reverse key indexes is that queries on a reverse key index have limited usefulness. In other words, a query on a reverse key index generally has to be unique and specific to be effective. This means range scan queries and other relational order type queries (e.g., less than, greater than queries) cannot be performed efficiently. The reason is that reverse key indexes lose the notion of ordering in the leaf values. Thus, to perform a range scan, the database system would have to traverse every item in the index to determine if it falls within the specified range (e.g., since there is no ordering).

Another approach to the right-growing problem is to use a hash-partitioned indexed. A hash-partitioned index in which each partition is represented as a B-Tree can be used to reduce right growing leaf contention. However, hash-partitioned indexes have the same inherent problems associated with the reverse key indexes. Values are spread across multiple locations. Thus, to perform a range scans, a database system must scan every partition of the index. As a result, scan performance is not as good as is the case with a single index (e.g., because in a single index scan positioning needs to be done just once). In addition, hash-partitioned indexes have manageability problems, since they require maintaining separate schema objects for each partition.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
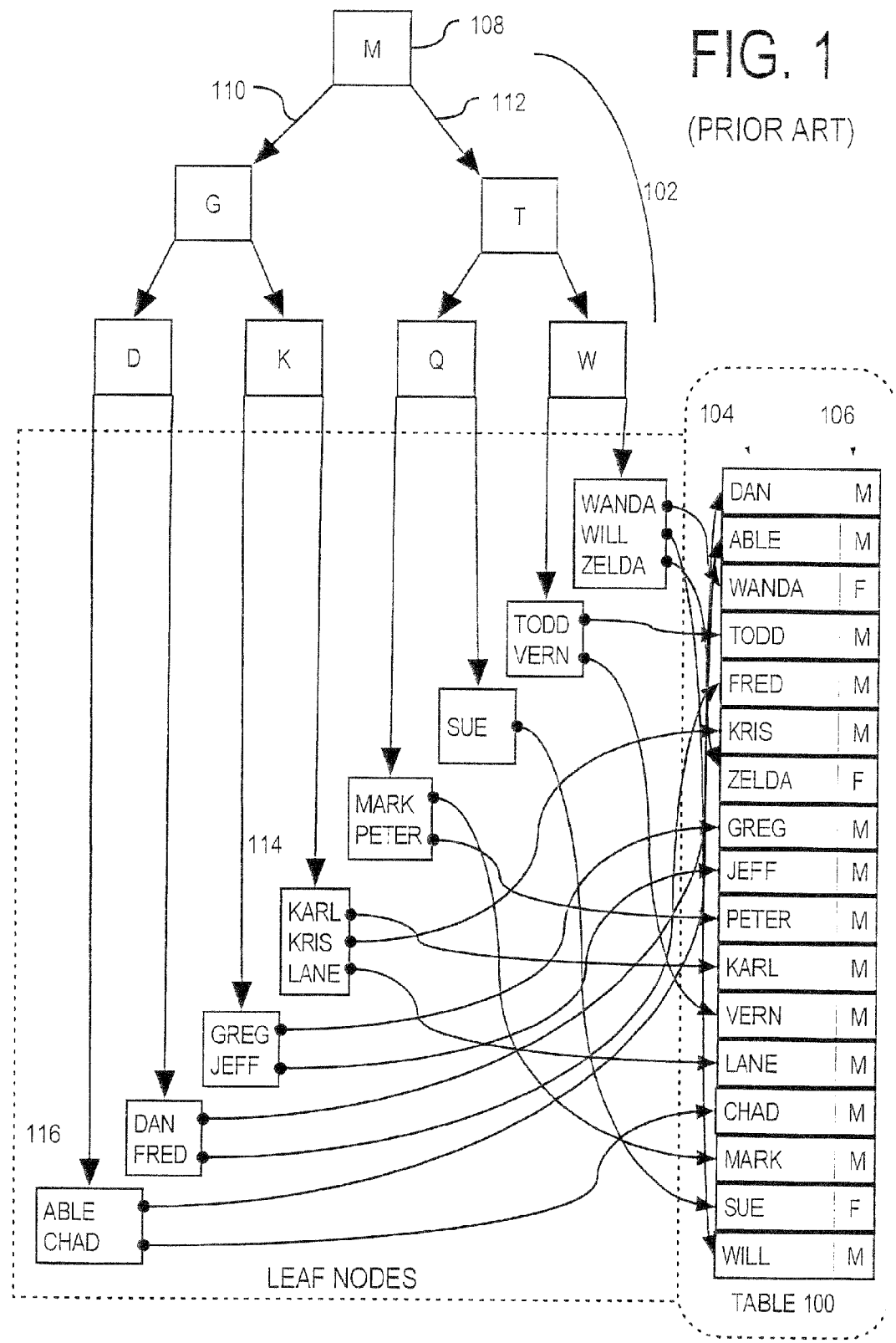
FIG. 1 is a block diagram illustrating an exemplary table with a corresponding B-Tree index.
Figure 2:
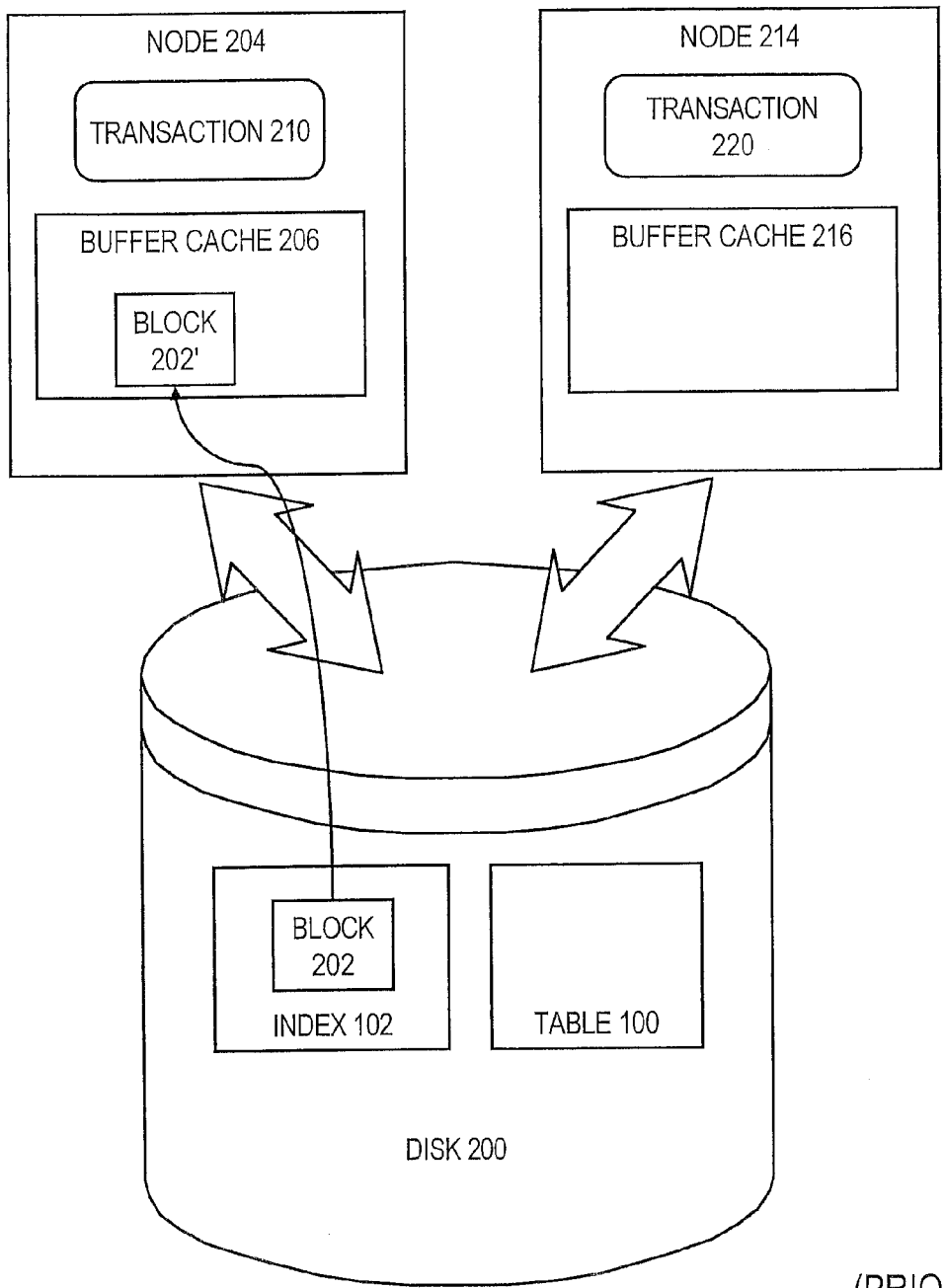
FIG. 2 is a block diagram of a system that includes two nodes and a disk.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

According to one embodiment, a partial reverse key index allows distributed contention as resources vie to insert data into an index as well as allows range scans to be performed on the index. To do so, before an index entry for a key value is inserted into an index, the key value is transformed using a transformation operation that affects a subset of the order of the key value. The index entry is then inserted based on the transformed key value. Because the transformation operation affects the order of the key value, the transformed values associated with two consecutive key values will not necessarily be consecutive. Therefore, the index entries associated with the consecutive key values may be inserted into unrelated portions of the index.

For example, the transformation operation may involve switching the positions of various portions of the key value. According to one embodiment, the characters in a text string are partially reversed. For example, all but the first letter are reversed. Thus, the key words KEN, KENT and KENNETH could be converted to KNE, KTNE and KHTENNE, respectively. Although, the transformed key values still begin with the letter K, the subsequent letters (e.g., "N", "T" and "H") are now different. Thus, the index entries for these values, in one embodiment, are inserted into different portions of an index.

Then, according to one embodiment, when the index is used to process a query, the key values in the query are transformed using the same transformation operation as was used to transform the key values of the index entries. For example, if a query requires the retrieval of all rows containing the name "KEN", the word "KEN" in the query is transformed as follows: "KEN" begins with the letter "K", so all blocks in the index that correspond to names beginning with "K" are identified as potentially containing matches. Then, the subset portion (e.g., "EN") is reversed. In this case, "EN" is reversed to form "NE". The "K" blocks in the index are then traversed to find leaf nodes that contain the key letters "NE" as subsets of the value. If any matches are found, the database server then follows the pointers associated with index entries for the key letters "NE" to determine the location of the rows that contain the name "KEN". In this way, queries traverse many fewer objects than in a complete reverse key index.

Note that, in one embodiment, before key values from index entries are presented to a user or to other parts of the database system, the inverse of the transformation operation is performed. In the example given above, the transformation operation is its own inverse. That is, a second reversal of the characters in a string on which a reversal has been performed recreates the initial character string. Thus, a reversal of "KEN" yields "K" and "NE", and a reversal of "K" and "NE" yields back "KEN".

In one embodiment, a partial key index also makes it possible to perform range scans, since keys in leaf blocks are still ordered by an initial key prefix. For example, a range scan for all names beginning with the "KEN" through "MARY" is possible to perform without having to scan every item in the index. The range scan can look at blocks that contain the initial prefixes and then perform any additional analysis on those blocks alone.

In one embodiment, this provides an effective approach to spreading the contention for inserts using a single B-tree, without losing the ability to support range scans, and with low (bounded) overhead on range scan performance. Note that none of the underlying basic B-tree logic needs to be changed.

Partial Reverse Key Index

A partial reverse key index is an index where a subset of an index key value is reversed. For example, an index key value may be a 40 bit number (e.g., a timestamp or other piece of data). In such an example, to create a partial reverse key index value the 20 lowest order bits may be reversed (while the 20 highest order bits remain fixed). To state the rule generally, if an index key requires K bits for its representation, the lower N bits of each key may be reversed. Thus the key values remain ordered in the higher bits allowing range scans to be performed. Yet, at the same time, the partial key index distributes the contention of insertions of successively increasing values across multiple blocks.

In one embodiment, the value of N can depend on the number of (key, value) pairs that can fit within a leaf block. For example, if 1000 items fit into a block, then on a 20-bit key, N may be chosen as 10 (e.g., $2^{10}=1024$). In other embodiments, the size of the block may have no correlation to the value of N.

It should be noted here that in some of the examples provided herein partial reverse key indexing is described in terms of reversing bytes. This is done for simplicity, but should not be construed as the only means for performing partial reverse key indexing. As noted above, a partial reverse key can be based on the bits of an index value.

Accordingly, various other transformations may be used to yield transformed key values that more evenly distribute consecutive entries across the index structure. For example, within a computer system, all types of data (e.g. character strings, integers, and real numbers) are stored as a sequence of bytes. According to one embodiment of the invention, key values are transformed before insertion into the index by partially reversing the order of the bytes.

Table 1 illustrates a table that has three columns and four rows. The three columns store three types of data. Specifically, column A stores a number, column B stores a string of characters, and column C stores a date.

TABLE 1

| A | B | C |
|---|---|---|
| 10001 | fghij | 95.10.25 23:07:58 |
| 10002 | klmno | 95.10.25 23:17:03 |
| 10003 | pqrst | 95.10.25 23:26:25 |

Table 2 illustrates how a database system may store the data in Table 1 as a series of bytes. In Table 2, each byte is represented by a two-digit hexadecimal number. The first byte in each column indicates how many subsequent bytes are used to represent the stored value. For example, the number 10001 is represented by the four bytes c3 02 01 02. Therefore the four bytes that represent the number 10001 are preceded by the byte 04. The fourth column in Table 2 stores a unique identifier that is assigned to each row (a "rowid").

TABLE 2

| (number) A | (varchar) B | (date) C | (rowid) |
|---|---|---|---|
| 04 c3 02 01 02 | 05 66 67 68 69 6a | 07 cb 0a 19 17 07 3a 00 | 0c 00 03 5e 00 fe |
| 04 c3 02 01 03 | 05 6b 6c 6d 6e 6f | 07 cb 0a 19 17 11 03 00 | 08 00 03 b3 01 0d |
| 04 c3 02 01 04 | 05 70 71 72 73 74 | 07 cb 0a 19 17 1a 17 00 | 5c 4a 22 16 01 45 |

Table 3 illustrates how index entries for the data in Table 2 are transformed for insertion into a partial reverse index according to an embodiment of the invention. As illustrated in Table 3, the first byte in each column still indicates how many subsequent bytes are used to represent the stored value. However, the actual bytes that represent the key values are partially reversed. In other words, in this example, the first two bytes remain fixed and the others have been reversed. Thus, the number 10001 is represented by the bytes c3 02 02 01, rather than the bytes c3 02 01 02. Similarly, the character string "fghij" is represented by the bytes 66 67 6a 69 68 rather than 66 67 68 69 6a. The rowid values are used as pointers to identify the rows that correspond to the entries, and are not themselves key values. In the exemplary index entries shown in Table 3, the rowid values have not been transformed.

TABLE 3

| (number) A | (varchar) B | (date) C | (rowid) |
| --- | --- | --- | --- |
| 04 c3 02 02 01 | 05 66 67 6a 69 68 | 07 cb 0a 00 3a 07 17 19 | 0c 00 03 5e 00 fe |
| 04 c3 02 03 01 | 05 6b 6c 6f 6e 6d | 07 cb 0a 00 03 11 17 19 | 08 00 03 b3 01 0d |
| 04 c3 04 02 | 05 70 71 74 73 72 | 07 cb 0a 00 17 1a 17 19 | 5c 4a 22 16 01 45 |

In other embodiments, the partial reverse key may be something other than just a reverse of certain bits or bytes of an index key value. For example, in one embodiment, an index value may be partially hashed rather than reversed. In such an embodiment, high order bits would remain fixed and lower order bits would be hashed. Techniques for hashing are well-known in the art and are therefore not discussed at any length herein.

Partial Reverse Key System

Figure 3:
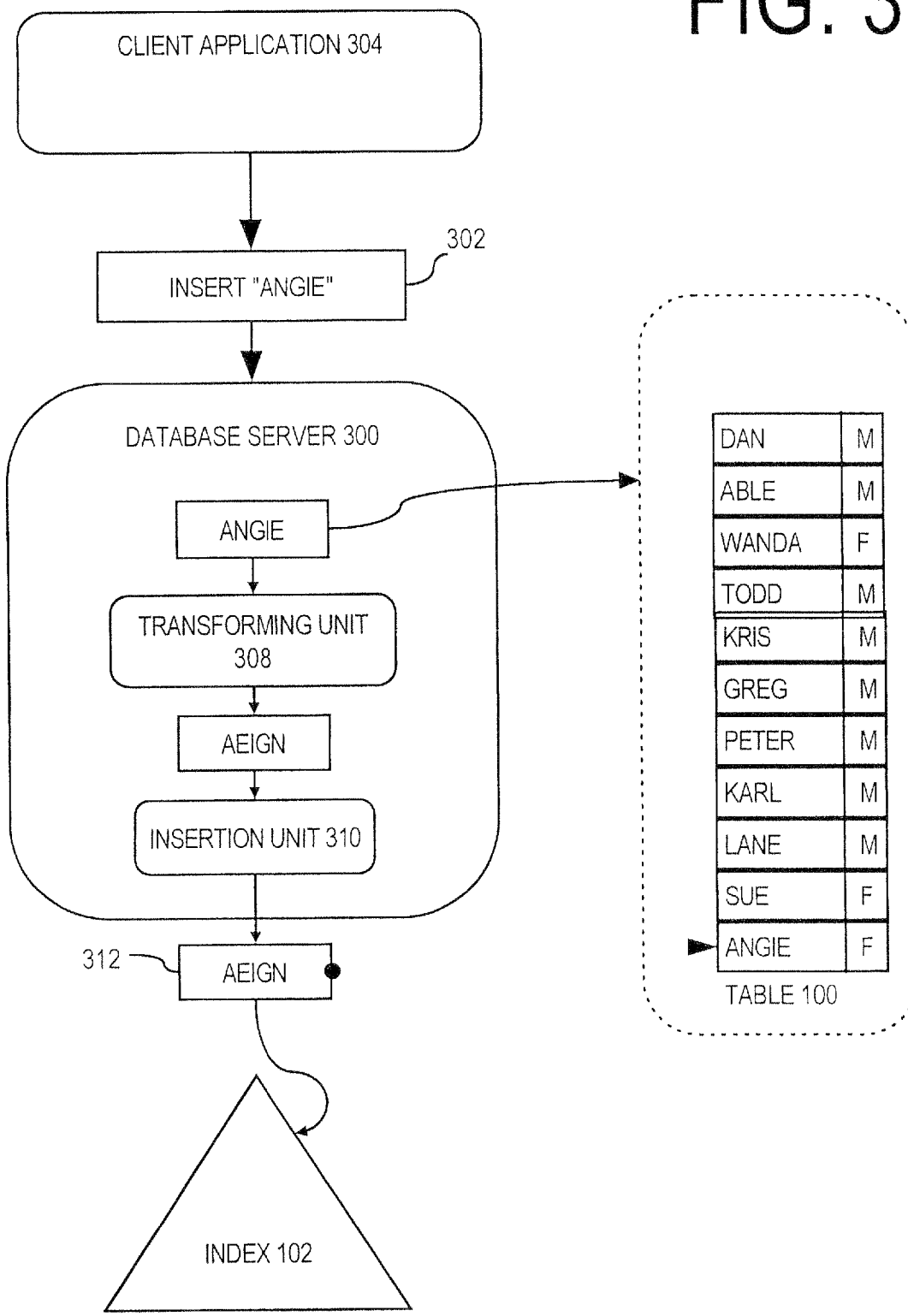
FIG. 3 is a block diagram illustrating the operations performed by a database server 300 that implements an embodiment of the invention.

FIG. 3 is a block diagram illustrating the operations performed by a database server 300 that implements an embodiment of the invention. A client application 304 issues a command 302 that requires the insertion of an entry "ANGIE" into table 100. The database server 300 inserts the entry into table 100. Assume for simplicity that the key value is fixed up to 8-bytes and that the highest order byte remains fixed (e.g., the first letter of a word or name remains fixed). Note that partial reverse index keys do not need to be the same length.

In FIG. 3, a transformation unit 308 in the database server performs the partial reverse on the characters of the key word "ANGIE" to produce a transformed key word "AEIGN". The transformed key word is passed to an insertion unit 310 that inserts the entry 312 into the index 102 associated with table 100. The entry includes the transformed key word "AEIGN" and a pointer to the newly inserted row that contains "ANGIE" in table 100. The entry is stored in the leaf node of index 102 that is associated with the value "AEIGN", rather than the leaf node that would store the entry for the key word "ANGIE".

In a partially reversed key index, the index entries are stored according to the transformed key values. The key values represented by the entries in a leaf node should fall in the value range generally associated with the leaf node. For example, a leaf node associated with the range "A"-"D" would store entries for words that begin in "A" or "D". Consequently, queries that involve a comparison between key values can still be processed relatively efficiently by the partial reverse key indexes.

For example, assume that a query requests all rows that contain names that alphabetically precede the name "KAREN". Names that alphabetically precede the name "KAREN" may begin with any of the letters "A" through "J" and any name beginning with "K" that alphabetically precedes "KAREN". Assume leaf nodes in the index are indexed by letter. In one embodiment, partial reverse key index entries for the rows that precede the name "KAREN" should be stored in leaf nodes that are indexed accordingly (e.g., with any of the letters "A" through "J"). To process such a query would require the inspection of any leaf nodes of the index 102 that indexes names that begin with a letter from "A" through "J". In addition, the inspection of leaf nodes would look at any leaf nodes that are indexed with "K". The result of the query may be to process a few extra "K" leaf nodes to determine which "K" names precede "KAREN", but on the whole the query avoids processing a large number of leaf nodes it would have had to process otherwise. Under such circumstances, using the partial reverse key index to process the query is much more efficient than a reverse key index. Thus, the partial reverse key index can handle both matching and non-matching queries in a relatively efficient manner.

For example, according to one embodiment of the invention, database server 300 includes a query optimizer that determines how each query should be processed. If the query optimizer receives a query that requires a matching comparison (e.g. name=DAN) then the query optimizer determines can use the partial key index to process the query and it will be basically as efficient as a look-up in a reverse key index. If the query optimizer receives a query that requires a non-matching comparison (e.g. name<"FRED"), then the partial reverse key index can be used to scan for the range of names <"FRED" as described above.

Other Variations

In one embodiment, partial reverse key indexes use other techniques to further enhance the efficiency of queries. For example, a database system implementing a partial reverse key index may also user a deferred insertion approach to better allocate entries as they are received. A deferred insertion approach occurs when data is accumulated into some staging area on the database server, then after a predetermined amount of data has been received or a predetermined time period has passed, the database server allocates the storage and the other resources necessary to insert the data most efficiently. IN this way, the database server can insert data in chunks to avoid bottlenecks and it can more effectively use disk storage by allocating the number of blocks necessary to store the data. In addition, the database server can plan how to update records in the database by retrieving a particular block for a particular session and performing multiple updates to that block before releasing it.

In other embodiments, other mechanisms may be used to enhance index performance.

Hardwire Overview

Figure 4:
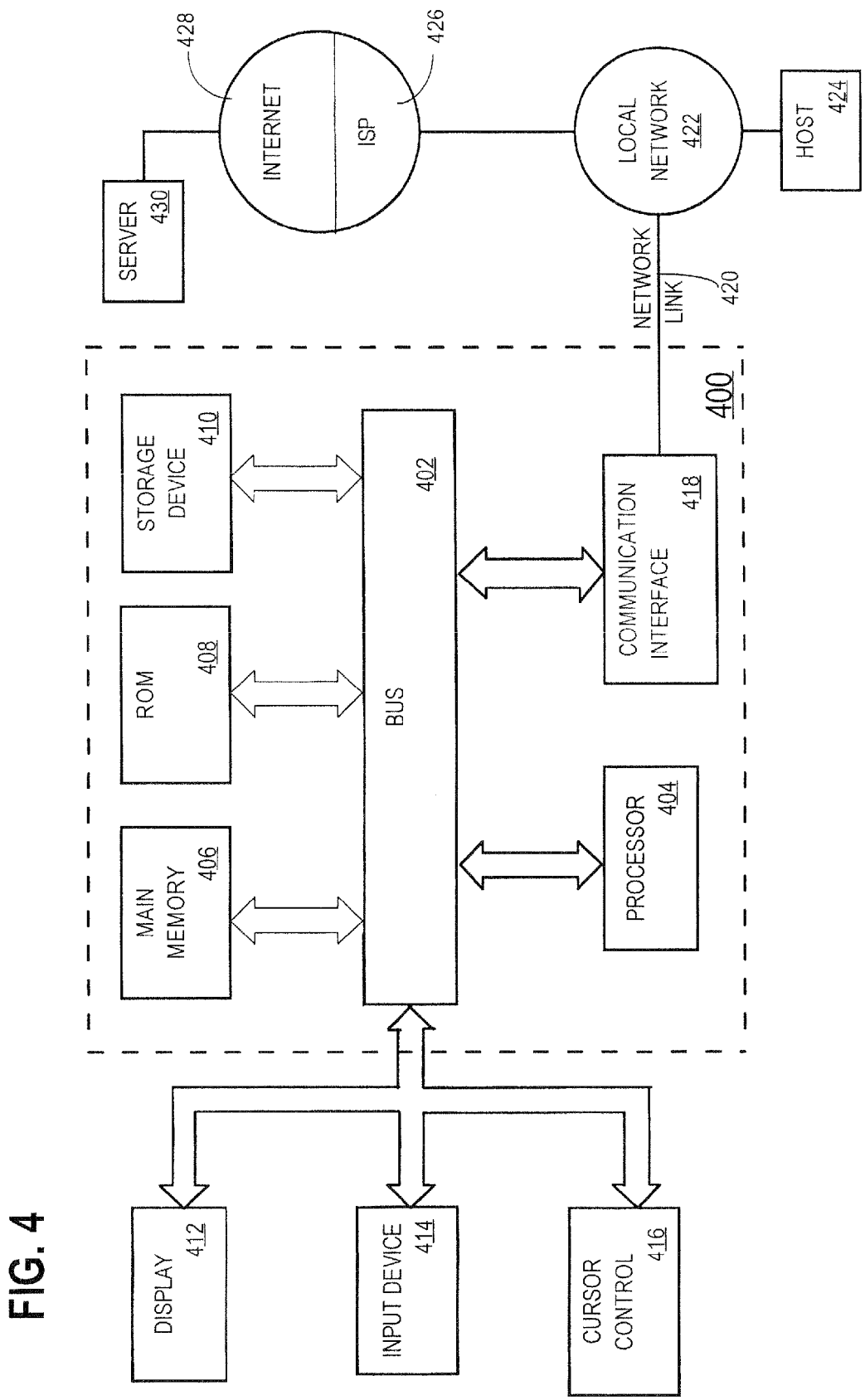
FIG. 4 is a block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one implementation of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative implementations, hard-wired circuitry may be used in place of or in combination with software instructions to implement the invention. Thus, implementations of the invention are not limited to any specific combination of hardware circuitry and software.

The term "computer-readable medium" as used herein refers to any medium that participates in providing data that causes a machine to operation in a specific fashion. In an implementation implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave. In the foregoing specification, implementations of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

We claim:

1. A method for inserting entries into a hierarchical tree-structured index, the method comprising the steps of:
   receiving an entry to be inserted into the hierarchical tree-structured index;
   identifying a key value in said entry, wherein said key value includes at least a first subset of data and a second subset of data;
   generating a transformed key value by performing an operation on the first subset of data from said key value, without performing said operation on said second subset of data from said key value;

generating a transformed entry that includes said transformed key value;

storing said transformed entry in a location within said hierarchical tree-structured index that is based upon said transformed key value;

wherein said transformed key value causes said transformed entry to be stored in a location within said hierarchical tree-structured index that maintains said entry in at least a partial ordering.

2. The method of claim 1 further comprising reconstructing said key value from said transformed entry by performing an inverse transformation on said transformed key value.

3. The method of claim 1 wherein:
the step of generating said transformed key value includes changing the order of information in said first subset of data.

4. The method of claim 3 wherein changing the order of information in said first subset of data includes changing the order of bits of said first subset of data.

5. The method of claim 3 wherein changing the order of information in said first subset of data includes changing the order of bytes in said first subset of data.

6. The method of claim 3 wherein changing the order of information in said first subset of data is performed by reversing the order of information in said first subset of data.

7. The method of claim 6, wherein the first subset of data is at a lower order, in said key value, than said second subset of data.

8. The method of claim 1 further comprising the steps of:
receiving a query that specifies a body of data associated with said hierarchical tree-structured index;
identifying a specified key value in said query;
generating a transformed search key by performing said operation on said specified key value;
locating an entry of said hierarchical tree-structured index based on said transformed search key; and
inspecting said entry to determine which data, within said body of data, satisfies said query.

9. The method of claim 1 further comprising the steps of:
receiving a query that specifies data in said body of data;
determining whether said query involves a non-matching comparison;
using said hierarchical tree-structured index to process said query.

10. A computer-readable storage medium storing instructions for inserting entries into a hierarchical tree-structured index, the instructions including instructions which, when executed by one or more processors, cause the one or more processors to perform the steps of:
receiving an entry to be inserted into the hierarchical tree-structured index;
identifying a key value in said entry, wherein said key value includes at least a first subset of data and a second subset of data;

generating a transformed key value by performing an operation on the first subset of data from said key value, without performing said operation on said second subset of data from said key value;

generating a transformed entry that includes said transformed key value;

storing said transformed entry in a location within said hierarchical tree-structured index that is based upon said transformed key value;

wherein said transformed key value causes said transformed entry to be stored in a location within said hierarchical tree-structured index that maintains said entry in at least a partial ordering.

11. The computer-readable storage medium of claim 10 further comprising instructions for reconstructing said key value from said transformed entry by performing an inverse transformation on said transformed key value.

12. The computer-readable storage medium of claim 10 wherein:
the step of generating said transformed key value includes changing the order of information in said first subset of data.

13. The computer-readable storage medium of claim 12 wherein changing the order of information in said first subset of data includes changing the order of bits of said first subset of data.

14. The computer-readable storage medium of claim 12 wherein changing the order of information in said first subset of data includes changing the order of bytes in said first subset of data.

15. The computer-readable storage medium of claim 12 wherein changing the order of information in said first subset of data is performed by reversing the order of information in said first subset of data.

16. The computer-readable storage medium of claim 15 wherein the first subset of data is at a lower order, in said key value, than said second subset of data.

17. The computer-readable storage medium of claim 10 further comprising instructions for:
receiving a query that specifies a body of data associated with said hierarchical tree-structured index;
identifying a specified key value in said query;
generating a transformed search key by performing said operation on said specified key value;
locating an entry of said hierarchical tree-structured index based on said transformed search key; and
inspecting said entry to determine which data, within said body of data, satisfies said query.

18. The computer-readable storage medium of claim 10 further comprising instructions for:
receiving a query that specifies data in said body of data;
determining whether said query involves a non-matching comparison;
using said hierarchical tree-structured index to process said query.

* * * * *